United States Patent
Zhu

(10) Patent No.: US 10,113,688 B2
(45) Date of Patent: Oct. 30, 2018

(54) MAGNETIC MOUNTING APPARATUS AND METHOD

(71) Applicant: Suzhou Uni-Solution Import and Export Co., Ltd., Suzhou (CN)

(72) Inventor: Yiran Zhu, Suzhou (CN)

(73) Assignee: Suzhou Uni-Solution Import and Export Co., Ltd., Jiangsu, Suzhou (CN)

( * ) Notice: Subject to any disclaimer, the term of this patent is extended or adjusted under 35 U.S.C. 154(b) by 0 days.

(21) Appl. No.: 15/826,769

(22) Filed: Nov. 30, 2017

(65) Prior Publication Data

US 2018/0259119 A1    Sep. 13, 2018

(30) Foreign Application Priority Data

Mar. 10, 2017 (CA) ..................... 2960475

(51) Int. Cl.
| | | |
|---|---|---|
| *F16M 11/00* | (2006.01) | |
| *F16M 13/02* | (2006.01) | |
| *F16M 11/14* | (2006.01) | |
| *F16M 11/04* | (2006.01) | |
| *F16B 1/00* | (2006.01) | |
| *F16C 11/10* | (2006.01) | |

(52) U.S. Cl.
CPC .............. *F16M 13/02* (2013.01); *F16B 1/00* (2013.01); *F16C 11/106* (2013.01); *F16M 11/041* (2013.01); *F16M 11/14* (2013.01); *F16B 2001/0035* (2013.01)

(58) Field of Classification Search
CPC . Y10T 24/32; Y10T 292/11; F16B 2001/0035

USPC ................................ 248/206.5; 24/303
See application file for complete search history.

(56) References Cited

U.S. PATENT DOCUMENTS

| | | | | |
|---|---|---|---|---|
| 4,779,314 A | * | 10/1988 | Aoki ................. | A41F 1/002 24/303 |
| 4,825,526 A | * | 5/1989 | Shenier ............. | A41F 1/002 24/303 |
| 6,305,656 B1 | * | 10/2001 | Wemyss ............ | A47G 23/0216 206/5 |
| 6,895,642 B2 | * | 5/2005 | Huang .............. | A47G 1/17 24/303 |
| D696,673 S | | 12/2013 | Vogel | |
| D696,674 S | | 12/2013 | Vogel | |
| 8,602,376 B2 | | 12/2013 | Vogel et al. | |

(Continued)

*Primary Examiner* — Steven M Marsh
(74) *Attorney, Agent, or Firm* — Davis & Bujold PLLC; Michael J. Bujold

(57) ABSTRACT

A magnetic mounting apparatus has a base structure that includes a steel ball. A magnet is provided that has a peripheral exterior sidewall, a first face and a second face. The steel ball is secured to the first face of the magnet solely by magnetic attraction. A friction collar is provided that has an internal shoulder, a skirt section that extends in a first direction from the shoulder along the peripheral exterior sidewall of the magnet and terminates in a contact edge co-planar with the second face of the magnet and a bowl section extends in a second direction from the shoulder and surrounds the first face. The contact edge provides friction to dampen movement of the magnet along a surface of an object to which the second face of the magnet is secured. The bowl section provides friction to dampen movement of the steel ball.

7 Claims, 4 Drawing Sheets

(56) References Cited

U.S. PATENT DOCUMENTS

| | | |
|---|---|---|
| 8,870,146 B2 | 10/2014 | Vogel et al. |
| D719,959 S | 12/2014 | Vogel |
| 8,950,727 B2 * | 2/2015 | Skudelny ............... B63C 11/205 128/201.27 |
| D734,746 S | 7/2015 | Vogel |
| 9,765,921 B2 | 9/2017 | Vogel et al. |
| D809,449 S * | 2/2018 | Zhang .......................... D12/415 |
| 2014/0374554 A1 * | 12/2014 | Jordan ................. F16M 13/022 248/206.5 |

* cited by examiner

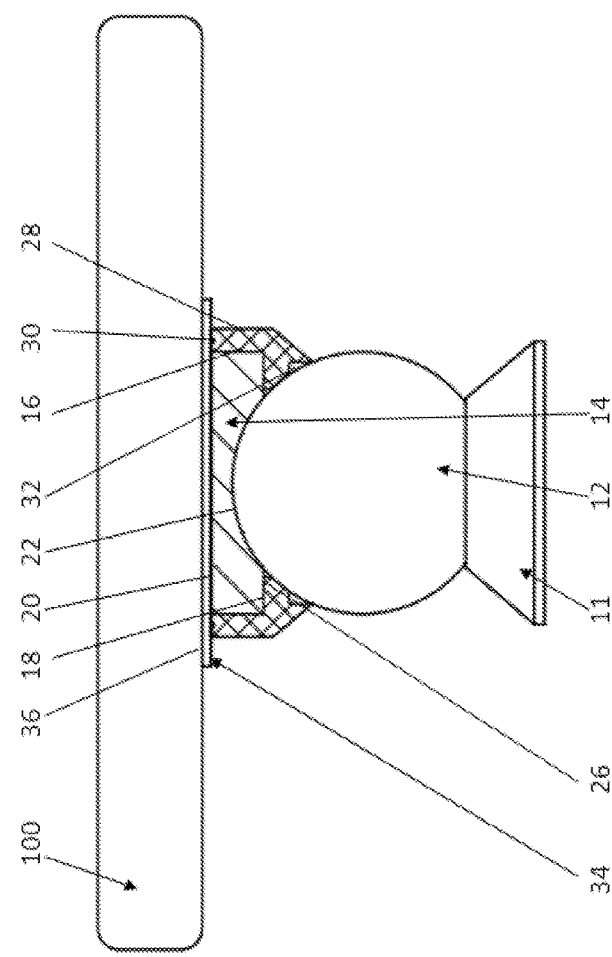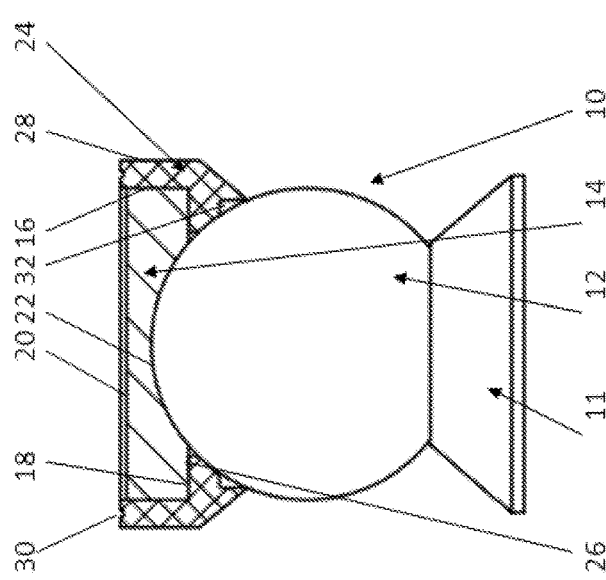

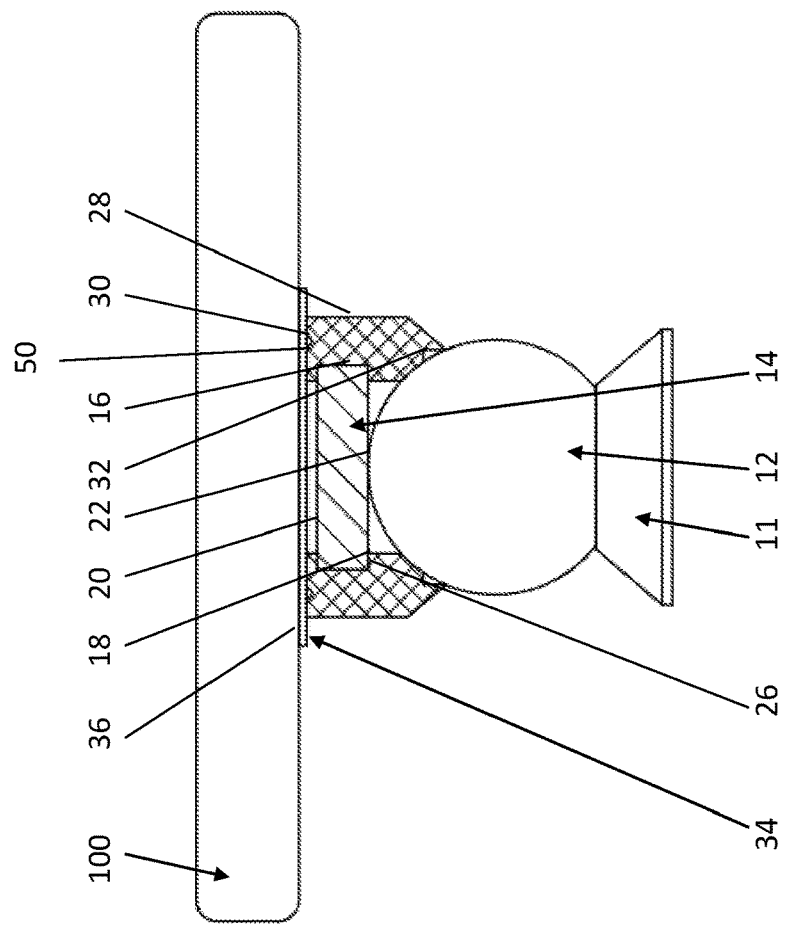
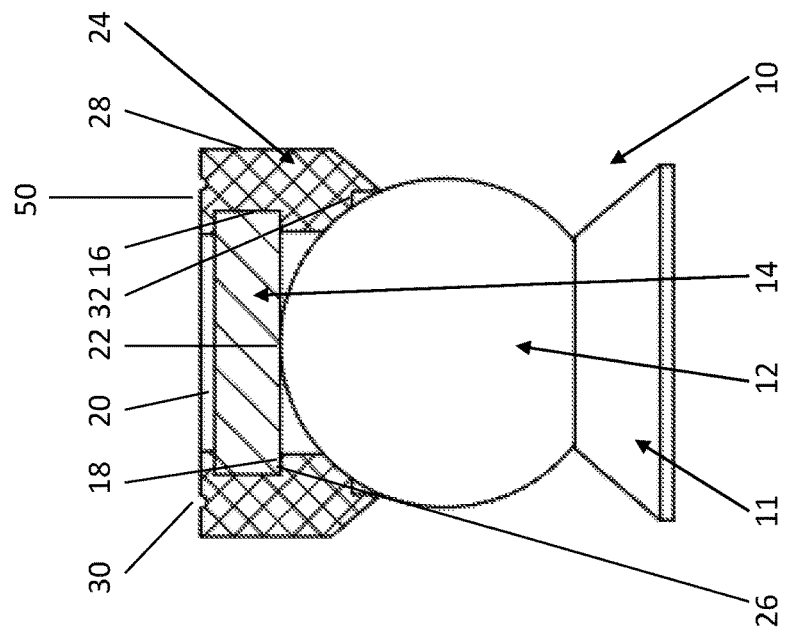

MAGNETIC MOUNTING APPARATUS AND METHOD

FIELD

There is described a magnetic mounting apparatus that was developed for use with cellular telephones and other personal electronic devices. However, the magnetic mounting apparatus has broader application and can be used with other objects.

BACKGROUND

U.S. Pat. No. 8,602,376 (Vogel et al) entitled "Multi-positional mount for personal electronic devices with a magnetic interface" discloses a magnetic mounting apparatus.

SUMMARY

According to one aspect there is provided a magnetic mounting apparatus that has a base structure that includes a steel ball. A magnet is provided that has a peripheral exterior sidewall, a first face and a second face. The steel ball is secured to the first face of the magnet solely by magnetic attraction. A friction collar is provided that has an internal shoulder that engages the first face of the magnet. A skirt section extends in a first direction from the shoulder along the peripheral exterior sidewall of the magnet and terminates in a contact edge co-planar with the second face of the magnet. A bowl section extends in a second direction from the shoulder and surrounds the first face.

According to another aspect there is provided a method of magnetically mounting an object. A first step involves providing a magnetic mounting apparatus as described above. A second step involves mounting an object by securing the second face of the magnet to a surface of the object solely by magnetic attraction. The contact edge of the skirt section of the friction collar provides friction to dampen movement of the magnet along the surface to which the second face of the magnet is secured. A third step involves adjusting the relative positioning of the steel ball relative to the first face of the magnet to position the object at a desired angle. The bowl section of the friction collar engages the steel ball and provides friction to dampen movement of the steel ball.

This apparatus and method was developed for use with cellular telephones. It will be recognized that the method and apparatus can be used for other objects.

A recessed socket may be provided in the first face of the magnet to engage the steel ball.

When the object is made of steel, the second face of the magnet is secured directly to the object. However, the magnet does not interact with all materials. When a material is encountered with which the magnet does not interact, a steel mounting plate is secured with an adhesive to the object. The steel mounting plate then provides the surface to which the second face of the magnet is secured.

The contact edge of the skirt section of the friction collar is used to dampen movement of the magnet along the surface to which the second face of the magnet is secured. The anti-skid properties of the contact edge are enhanced by providing at least one slot.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 1 is a side elevation view, in section, of the magnetic mounting apparatus.

FIG. 2 is a side elevation view, in section, of the magnetic mount apparatus of FIG. 1 secured to a cellular telephone with a non-steel case.

FIG. 5 is a side elevation view, in section, of a commercial version of the magnetic mounting apparatus.

FIG. 6 is a side elevation view, in section, of the commercial version of the magnetic mount apparatus of FIG. 5 secured to a cellular telephone with a non-steel case.

DETAILED DESCRIPTION

Figure 4:
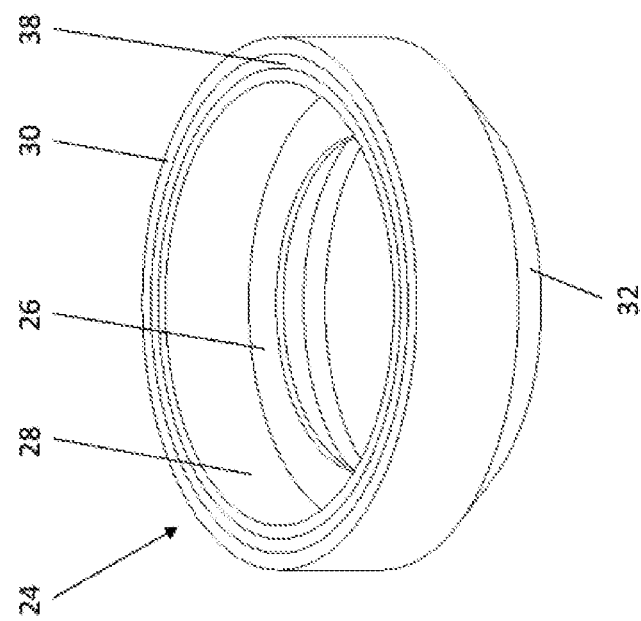
FIG. 4 is a bottom perspective view of a friction collar for the magnetic mounting apparatus of FIG. 1.

A magnetic mounting apparatus generally identified by reference numeral 10, will now be described with reference to FIG. 1 through FIG. 4. A commercial version of magnetic mounting apparatus 10 will then be described with reference to FIG. 5 through FIG. 8.

Figure 3:
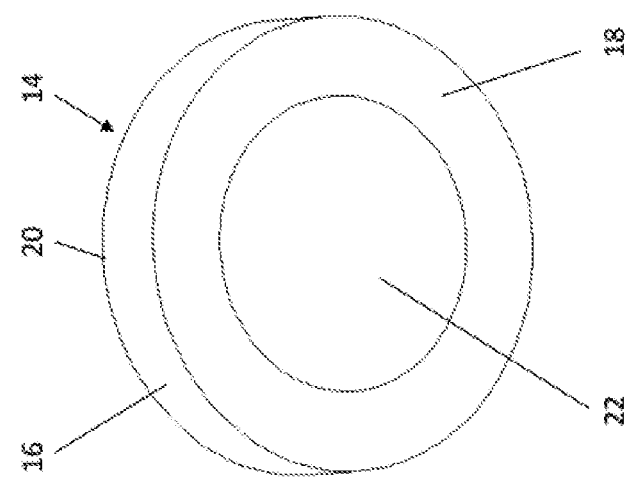
FIG. 3, is a perspective view of a magnet for the magnetic mounting apparatus of FIG. 1.

Structure and Relationship of Parts:

Referring to FIG. 1 and FIG. 2, magnetic mounting apparatus 10 that has a base structure 11 that includes a steel ball 12. Referring to FIG. 3, a magnet 14 is provided that has a peripheral exterior sidewall 16, a first face 18 and a second face 20. First face 18 has a recessed socket 22. Referring to FIG. 1 and FIG. 2, steel ball 12 is secured to socket 22 solely by magnetic attraction. Referring to FIG. 4, a friction collar 24 is provided that has an internal shoulder 26, a skirt section 28 extends in a first direction from shoulder 26 terminating in a contact edge 30 and a bowl section 32 that extends in a second direction from shoulder 26. Referring to FIG. 1 and FIG. 2, shoulder 26 engages first face 18 of magnet 14. Skirt section 28 extends in a first direction from shoulder 26 along peripheral exterior sidewall 16 of magnet 14 with contact edge 30 positioned co-planar with second face 20 of magnet 14. Bowl section 32 extends in a second direction from shoulder 26 and surrounds socket 22 on first face 18 of magnet 14. Referring to FIG. 2, wherein an object is being mounted that does not magnetically interact with magnet 14 (such as cellular phone case 100) a steel mounting plate 34 that has an adhesive backing 36 may be used. Referring to FIG. 4, the "anti-skid" properties of contact edge 30 may be enhanced by providing at least one slot 38.

Operation:

Referring to FIG. 2, adhesive backing 36 is used to secure steel mounting plate 34 to cellular phone case 100. Second face 20 of magnet 14 is then secured to steel mounting plate 34, which provides a surface on cellular phone case 100 that will interact with magnet 14. Magnet 14 is attached to steel mounting plate 34 solely by magnetic attraction. Friction collar 24 is then positioned over magnet 14, with skirt section 28 extending in a first direction from shoulder 26 along peripheral exterior sidewall 16 of magnet 14 with contact edge 30 positioned co-planar with second face 20 of magnet 14. Contact edge 30 of skirt section 28 of friction collar 24 provides friction to dampen movement of second face 20 of magnet 14 along the surface provided by steel mounting plate 34 to which second face 20 of magnet 14 is secured. Referring to FIG. 4, the "anti-skid" properties of contact edge 30 are enhanced by slot 38. Referring to FIG. 2, steel ball 12 is then inserted into friction collar 24 until socket 22 is engaged. The relative positioning of steel ball 12 and socket 22 is then pivotally adjusted to position cellular phone case 100 at a desired angle. Bowl section 32 of friction collar 24 engages steel ball 12 and provides friction to dampen movement of steel ball 12 in socket 22, thereby maintaining the selected angular positioning.

Although this apparatus and method was developed for use with cellular telephones. It will be recognized that the method and apparatus can be used for magnetically mounting other objects.

Structure and Relationship of Parts of Commercial Embodiment:

A commercial version of magnetic mounting apparatus 10 will now be described with reference to FIG. 5 through FIG. 8. There are two changes that have been made to the commercial embodiment. The first change relates to recessed socket 22. In the original embodiment illustrated in FIG. 1 through FIG. 4, first face 18 of magnet 14 had a recessed socket 22 with a curved surface to better engage the radius of curvature of steel ball 12. It has now been realized that recessed socket 22 is not required. Eliminating recessed socket 22 reduces the cost of magnet 14, without any adversely effect on performance. The second change relates to the addition of an inwardly projecting flange 50 to friction collar 24. The purpose of which will hereinafter be further describe. In the description which follows, except for the absence of recessed socket 22 and the addition of inwardly projecting flange 50, all of the elements are the same and have been identified with identical reference numerals used to describe FIG. 1 through FIG. 4.

Figure 8:
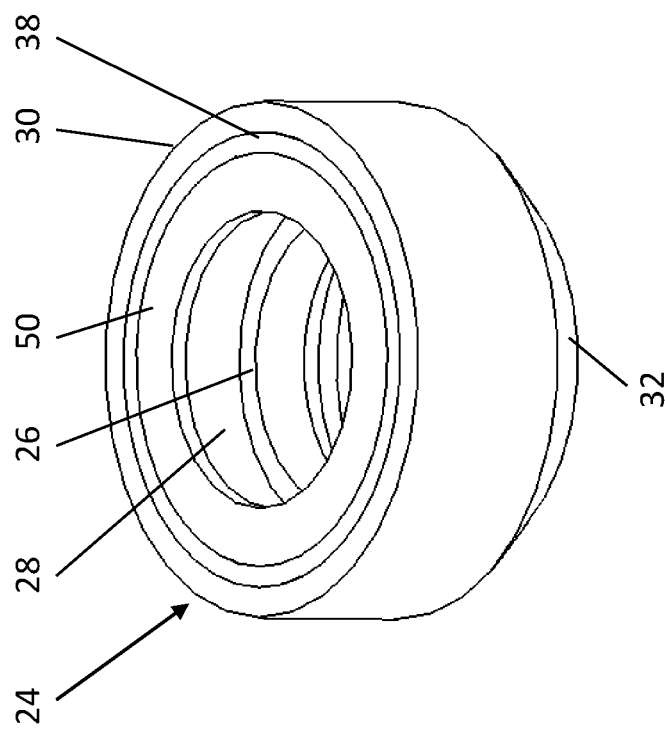
FIG. 8 is a bottom perspective view of a friction collar for the commercial version of the magnetic mounting apparatus of FIG. 5.
Figure 7:
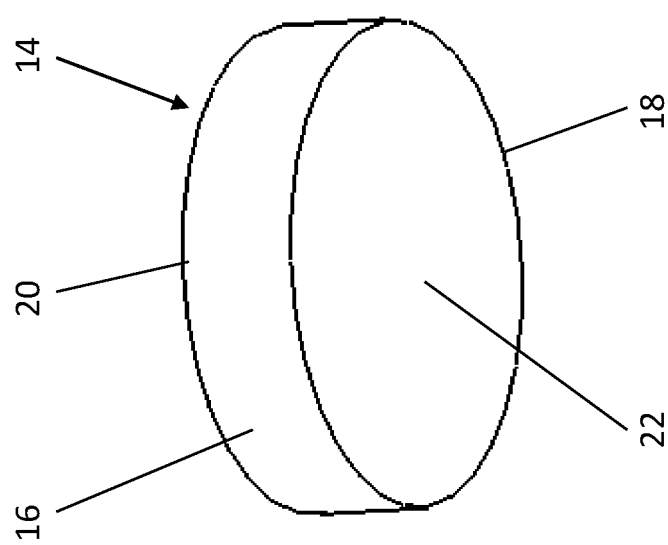
FIG. 7, is a perspective view of a magnet for the commercial version of the magnetic mounting apparatus of FIG. 5.

Referring to FIG. 5 and FIG. 6, magnetic mounting apparatus 10 that has a base structure 11 that includes a steel ball 12. Referring to FIG. 7, a magnet 14 is provided that has a peripheral exterior sidewall 16, a first face 18 and a second face 20. Referring to FIG. 1 and FIG. 2, steel ball 12 is secured to first face 18 of magnet 14 solely by magnetic attraction. Referring to FIG. 8, a friction collar 24 is provided that has an internal shoulder 26, a skirt section 28 extends in a first direction from shoulder 26 terminating in a contact edge 30 and a bowl section 32 that extends in a second direction from shoulder 26. Referring to FIG. 5 and FIG. 6, shoulder 26 engages first face 18 of magnet 14. Skirt section 28 extends in a first direction from shoulder 26 along peripheral exterior sidewall 16 of magnet 14 with contact edge 30 positioned co-planar with second face 20 of magnet 14. Bowl section 32 extends in a second direction from shoulder 26 and surrounds first face 18 of magnet 14. Referring to FIG. 6, wherein an object is being mounted that does not magnetically interact with magnet 14 (such as cellular phone case 100) a steel mounting plate 34 that has an adhesive backing 36 may be used. Referring to FIG. 4, the "anti-skid" properties of contact edge 30 may be enhanced by providing at least one slot 38.

Referring to FIG. 8, an inwardly projecting flange 50 has been added to friction collar 24. This is immediately apparent by comparing FIG. 8 and FIG. 4. Referring to FIG. 1, there was not originally an inwardly projecting flange. The presence or absence of inwardly projecting flange does not effect performance, when steel ball 12 is engaged with first face 18 of magnet 14. However, in the absence of steel ball 12, in the absence of inwardly projecting flange 50 there was nothing to prevent magnet 14 from sliding out of friction collar 24, when friction collar 24 was inverted. Referring to FIG. 5, inwardly projecting flange 50 maintains magnet 14 within friction collar 24, when friction collar 24 is inverted.

Operation of Commercial Embodiment:

Referring to FIG. 6, adhesive backing 36 is used to secure steel mounting plate 34 to cellular phone case 100. Second face 20 of magnet 14 is then secured to steel mounting plate 34, which provides a surface on cellular phone case 100 that will interact with magnet 14. Magnet 14 is attached to steel mounting plate 34 solely by magnetic attraction. Friction collar 24 is then positioned over magnet 14, with skirt section 28 extending in a first direction from shoulder 26 along peripheral exterior sidewall 16 of magnet 14 with contact edge 30 positioned co-planar with second face 20 of magnet 14. Contact edge 30 of skirt section 28 of friction collar 24 provides friction to dampen movement of second face 20 of magnet 14 along the surface provided by steel mounting plate 34 to which second face 20 of magnet 14 is secured. Referring to FIG. 4, the "anti-skid" properties of contact edge 30 are enhanced by slot 38. Referring to FIG. 2, steel ball 12 is then inserted into friction collar 24 and the relative positioning of steel ball 12 and friction collar 24 is then pivotally adjusted to position cellular phone case 100 at a desired angle. Bowl section 32 of friction collar 24 engages steel ball 12 and provides friction to dampen movement of steel ball 12, thereby maintaining the selected angular positioning.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

What is claimed is:

1. A magnetic mounting apparatus, comprising:
   a base structure comprising a steel ball;
   a magnet having a peripheral exterior sidewall, a first face and a second face, the steel ball being secured to the first face of the magnet solely by magnetic attraction;
   a friction collar having:
      an internal shoulder that engages the first face of the magnet,
      a skirt section that extends in a first direction from the shoulder along the peripheral exterior sidewall of the magnet and terminates in a contact edge co-planar with the second face of the magnet, and
      a bowl section that extends in a second direction from the shoulder and surrounds a portion of the steel ball, when the steel ball is secured to the first face of the magnet.

2. The magnetic mounting apparatus of claim 1, wherein a recessed socket is provided in the first face of the magnet, the recessed socket engaging the steel ball.

3. The magnetic mounting apparatus of claim 1, wherein a steel mounting plate is provided having an adhesive backing, whereby the steel mounting plate is secured with the adhesive backing to a surface of an object, the steel mounting plate provides a surface to which the second face of the magnet is secured solely be magnetic attraction.

4. The magnetic mounting apparatus of claim 1, wherein the contact edge of the skirt section of the friction collar has at least one slot.

5. A method of magnetically mounting an object, comprising:
   providing a magnetic mounting apparatus, comprising:
      a base structure comprising a steel ball;
      a magnet having a peripheral exterior sidewall, a first face and a second face, the steel ball being secured to the first face of the magnet solely by magnetic attraction;
      a friction collar having:
         an internal shoulder that engages the first face of the magnet,
         a skirt section that extends in a first direction from the shoulder along the peripheral exterior sidewall of the magnet and terminates in a contact edge co-planar with the second face of the magnet, and
         a bowl section that extends in a second direction from the shoulder and surrounds a portion of the steel ball, when the steel ball is secured to the first face of the magnet;
   mounting an object by securing the second face of the magnet to a surface of the object solely by magnetic attraction, the contact edge of the skirt section of the friction collar providing friction to dampen movement of the magnet along the surface to which the second face of the magnet is secured; and
   adjusting the relative positioning of the steel ball relative to the first face of the magnet to position the object at a desired angle, the bowl section of the friction collar engaging the steel ball and providing friction to dampen movement of the steel ball.

6. The method of claim 5, wherein a recessed socket is provided in the first face of the magnet, the recessed socket engaging the steel ball.

7. The method of claim 5, wherein a steel mounting plate is secured with an adhesive to the object, the steel mounting plate providing the surface to which the second face of the magnet is secured.

* * * * *